US011267353B2

(12) United States Patent
Dow

(10) Patent No.: US 11,267,353 B2
(45) Date of Patent: Mar. 8, 2022

(54) METHOD AND APPARATUS OF CONTROLLING BIDIRECTIONAL ON-BOARD CHARGER FOR ELECTRIC VEHICLES

(71) Applicant: HYUNDAI MOBIS Co., Ltd., Seoul (KR)

(72) Inventor: Young Soo Dow, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 103 days.

(21) Appl. No.: 16/923,704

(22) Filed: Jul. 8, 2020

(65) Prior Publication Data

US 2021/0008996 A1    Jan. 14, 2021

(30) Foreign Application Priority Data

Jul. 9, 2019    (KR) .................. 10-2019-0082708

(51) Int. Cl.
*B60L 53/22* (2019.01)
*B60L 53/62* (2019.01)
*B60L 53/24* (2019.01)
*H02J 7/04* (2006.01)
*H02J 7/00* (2006.01)

(52) U.S. Cl.
CPC ............... *B60L 53/22* (2019.02); *B60L 53/24* (2019.02); *B60L 53/62* (2019.02); *H02J 7/007182* (2020.01); *H02J 7/04* (2013.01)

(58) Field of Classification Search
CPC ....................................... B60L 53/22
USPC ........................................... 320/104
See application file for complete search history.

(56) References Cited

U.S. PATENT DOCUMENTS

2015/0001958 A1*  1/2015  Abe ............... B60L 15/007
                                                    307/104
2021/0155100 A1*  5/2021  Khaligh ........... B60L 53/22

* cited by examiner

*Primary Examiner* — Jerry D Robbins
(74) *Attorney, Agent, or Firm* — NSIP Law

(57) ABSTRACT

A bidirectional on-board charger (BOBC) may be disposed between an electric vehicle supply equipment (EVSE) and a battery equipped in an electric vehicle to convert power while performing charging/discharging in two-way direction, supply a converted DC power to the battery to driving the electric vehicle, convert a power of the battery into an AC power in converting power with respect to the EVSE, and supply the AC power to a grid or a load. In a method and apparatus of controlling a BOBC, an operation mode of the BOBC proceeds to an optimum point by comparing battery voltage values in a charging mode and proceeds to an optimum point on the basis of an accurate battery state value through a grid connection in a discharging mode.

11 Claims, 4 Drawing Sheets

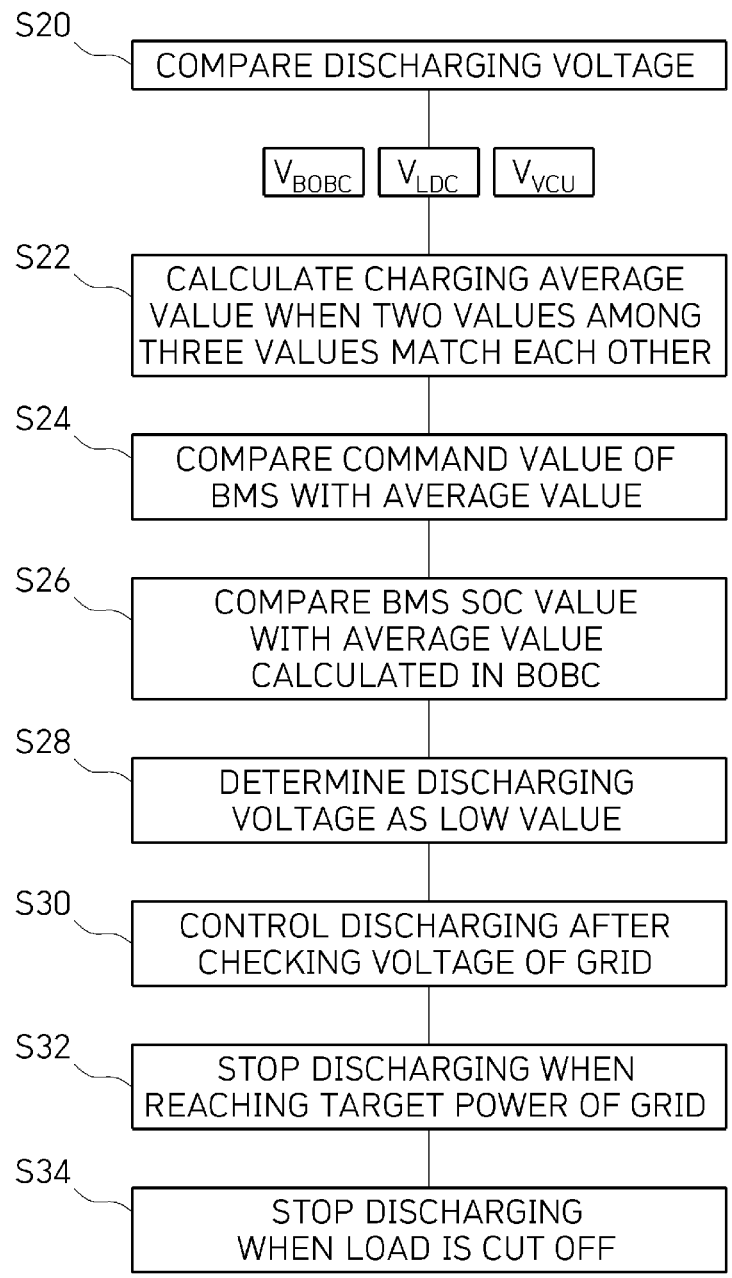

METHOD AND APPARATUS OF CONTROLLING BIDIRECTIONAL ON-BOARD CHARGER FOR ELECTRIC VEHICLES

CROSS-REFERENCE TO RELATED APPLICATIONS

This application claims priority under 35 U.S.C. § 119 to Korean Patent Application No. 10-2019-0082708, filed on Jul. 9, 2019, the disclosure of which is incorporated herein by reference in its entirety.

TECHNICAL FIELD

The present invention relates to a bidirectional on-board charger (BOBC) applied to electric vehicles, and more particularly, to a method and apparatus of controlling a BOBC, in which an operation mode of the BOBC proceeds to an optimum point by comparing battery voltage values in a charging mode and proceeds to an optimum point on the basis of an accurate battery state value through a grid connection in a discharging mode.

BACKGROUND

Electric vehicles, developed based on environmental pollution and enhancement of vehicle performance, are attracting much attention as eco-friendly vehicles in domestic and oversea vehicle market. Furthermore, the better charging/discharging efficiency of a BOBC which is a driving power important for driving electric vehicles is a technical problem which should be solved.

BOBCs performing a charging/discharging function between a grid and a battery is being actively researched up to date and is large in importance in driving an electric vehicle and returning electricity to an electrical grid.

Therefore, the suitable facilities of BOBCs should be secured, a lifetime of a battery should increase despite repeated charging/discharging, and technology for increasing a charging time and a driving-enabled distance should be developed.

FIG. 1 illustrates a first power conversion unit 2 for performing an operation of converting an alternating current (AC) power, input from the grid 1, into a direct current (DC) power and converting a DC power, input from a battery 5, into an AC power.

Also, FIG. 1 illustrates a charging/discharging apparatus including a second power conversion unit 3, which converts (for example, power conversion "400V (7)→430V (8)") an input voltage input from the first power conversion unit 2 or the battery 5 at a certain conversion rate (close to 1), and a third power conversion unit 4 which converts (for example, power conversion "430V (8)→240 to 400V (5)") an input voltage input from the second power conversion unit 3 or the battery 5 at a conversion rate based on a both-end voltage supplied to the battery 5.

However, in the related art, since power conversion is performed at a fixed rate, loss increases based on a variable range of an output voltage in performing power conversion, causing a reduction in total charging/discharging efficiency of a BOBC.

SUMMARY

Accordingly, the present invention provides a control method for overcoming a problem of the related art, where charging/discharging efficiency is reduced, and realizing the optimal efficiency of a BOBC for electric vehicles.

The present invention provides a method and apparatus of performing optimum point control through comparison of battery voltage values in a charging mode of a BOBC for electric vehicles and performing optimum point control for a grid connection on the basis of an accurate battery state value in a discharging mode.

A BOBC may be disposed between an electric vehicle supply equipment (EVSE) and a battery equipped in an electric vehicle to convert power while performing charging/discharging in two-way direction, supply a converted DC power to the battery to driving the electric vehicle, convert a power of the battery into an AC power in converting power with respect to the EVSE, and supply the AC power to a grid or a load.

In detail, a method of controlling a BOBC for electric vehicles according to an embodiment of the present invention will be described. Here, the method may include control performed in a charging mode and control performed in a discharging mode.

First, a control process (i.e., a control process of converting an AC voltage of a grid according to a voltage value of a DC battery for vehicles) in the charging mode will be described below.

In a step of monitoring a battery voltage value, a voltage of a BOBC supplied with a voltage from a battery and voltages of two or more objects (for example, a low DC-DC converter (LDC) and a vehicle control unit (VCU)) of an electric vehicle may be monitored and obtained.

When two values match each other by voting the monitored voltage values, an average value of the two voltage values may be calculated, and a voltage for optimum point control in the BOBC on the basis of the average value may be checked. In this case, a pre-written lookup table (chart) may be referred to. The lookup table may be written to include a voltage value for the optimum point control of the BOBC on the basis of the average value.

A command value of a battery management system (BMS) may be compared with the calculated average value.

Charging power control may be performed on the BOBC on the basis of a low value among the command value and a charging voltage value. In this case, the voltage variation rate to enable fast charging in a period where a voltage of the battery is low may be adjusted, the voltage variation rate in a main use region of the battery may be fixed to enhance efficiency, and the voltage variation rate may be adjusted to maintain the voltage of the battery in a period where the voltage of the battery is high, thereby reducing a charging time.

Next, a control process (i.e., a control process in a mode of performing a voltage of a battery according to a grid voltage, a home voltage, or a load power) in the discharging mode will be described below.

In a step of monitoring a battery voltage value, a voltage of a BOBC supplied with a voltage from a battery and voltages of two or more objects (for example, an LDC and a VCU) of an electric vehicle may be monitored and obtained.

When two values match each other by voting the monitored voltage values, an average value of the two voltage values may be calculated, and a voltage for optimum point control in the BOBC on the basis of the average value may be checked. In this case, a pre-written lookup table (chart) may be referred to.

A state of charge (SOC) value of a battery management system (BMS) may be compared with an SOC value calculated from the average value, thereby determining a discharging voltage on the basis of a low SOC value.

A voltage of a grid may be checked, and then, discharging control may be performed on the basis of the discharging voltage.

Other features and aspects will be apparent from the following detailed description, the drawings, and the claims.

BRIEF DESCRIPTION OF THE DRAWINGS

FIG. 6 is a flowchart of a control process performed in a discharging mode of a BOBC according to an embodiment of the present invention.

DETAILED DESCRIPTION OF EMBODIMENTS

Figure 1:
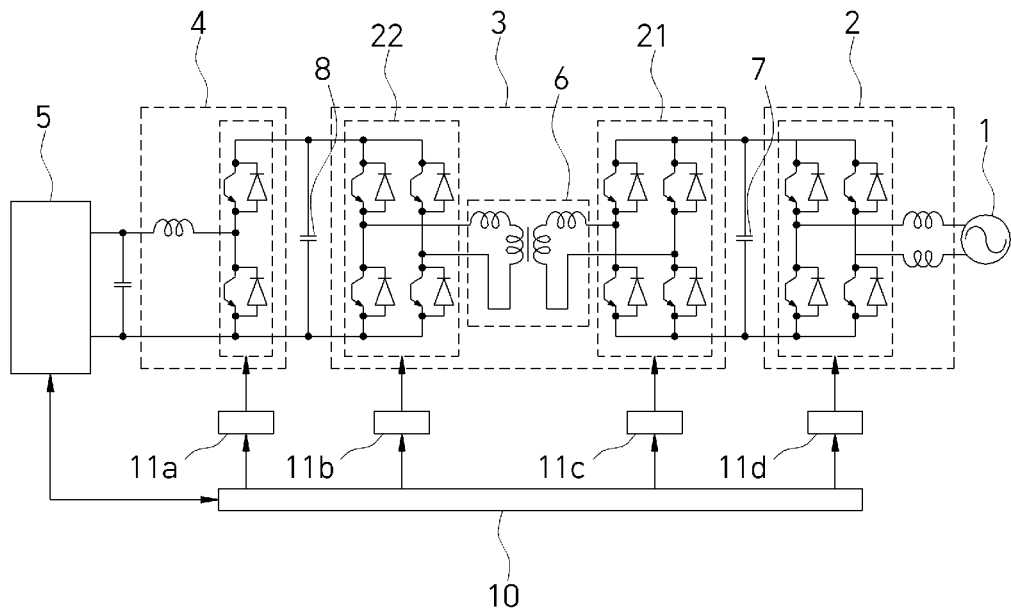
FIG. 1 is a circuit diagram of a BOBC of the prior art.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Figure 2:
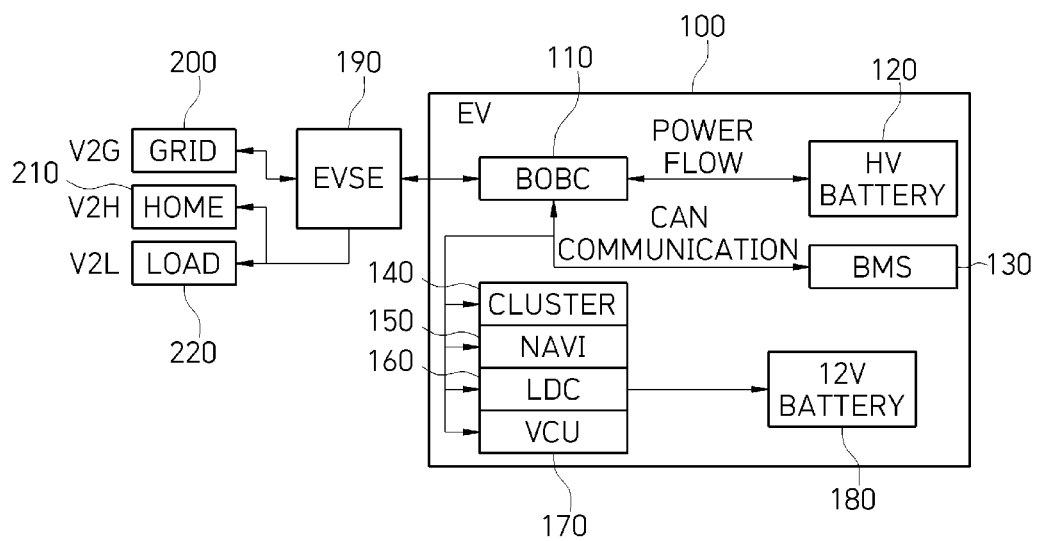
FIG. 2 is a block diagram of a power system of an electric vehicle.

FIG. 2 is a block diagram of a system associated with controlling a BOBC of an electric vehicle according to an embodiment of the present invention. Abbreviations used in the block diagram is as follows.

EV (100): Electric Vehicle

EVSE (190): ELECTRIC VEHICLE SUPPLY EQUIPMENT

BOBC (110): BI-DIRECTIONAL OBC

CLUSTER (140): vehicle charging/discharging state display unit

NAVI (150): vehicle charging/discharging, reservation/stop, and state display unit LDC (160): LOW DC-DC CONVERTER (12V battery charging power conversion unit)

VCU (170): VEHICLE CONTROL UNIT (vehicle motor control unit)

BMS (130): BATTERY MANAGEMENT SYSTEM (battery management unit)

HV battery (120): vehicle DC high voltage battery

GRID (200): V2G (Vehicle To Grid) which denotes a grid (national power network) for service HOME (210): V2H (Vehicle To Home) which denotes home power network for service LOAD (220): V2L (Vehicle To Load) which denotes short-period long-distance power network (for example, camping ground) for service The BOBC 110 disposed between the EVSE 190 and the HV battery 120 equipped in the EV 100 may convert power while performing charging/discharging in two-way direction.

The BOBC 110 may supply the converted power to the cluster 140, the NAVI 150, the LDC 160, the VCU 170, and the BMS 130.

The LDC 160 may supply a DC power to the 12V battery 180. Power converted in this manner may be supplied to each system to finally driving the EV 100.

As described above, the BOBC 110 for performing a function of supplying a converted DC power to the HV battery 120 to drive the EV 100 may convert a power of the HV battery 120 into an AC power and may supply the AC power to the grid 200, a home 210, and a load 220, in converting power with respect to the EVSE 190.

Figure 3:
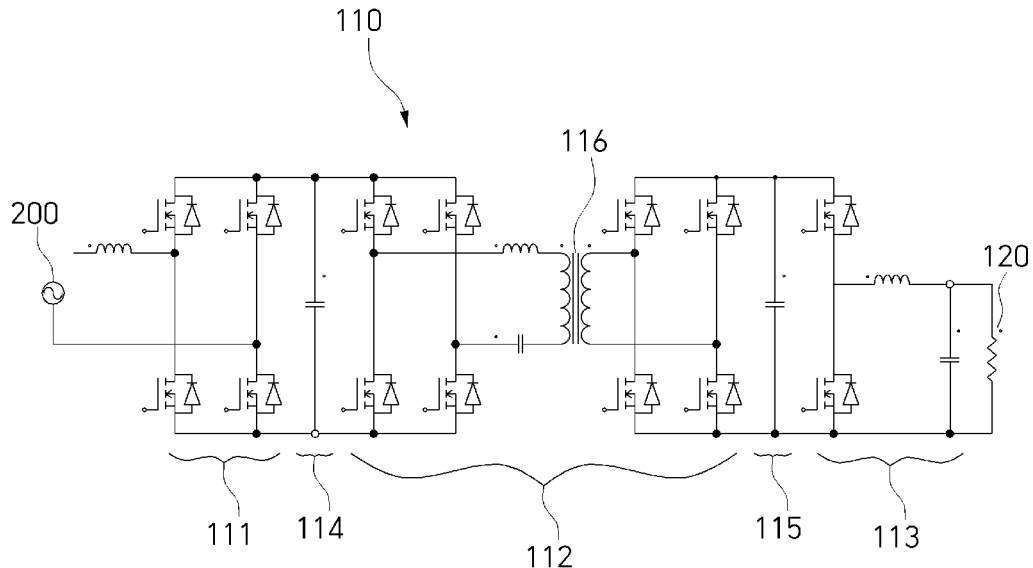
FIG. 3 is a circuit diagram of a BOBC according to an embodiment of the present invention.

FIG. 3 is a circuit diagram of a power converter 110 of the BOBC illustrated in FIG. 2.

Referring to FIG. 3, the power converter 110 may include a first power conversion unit 111 connected to the grid 200, a second power conversion unit 112, and a third power conversion unit 113. The second power conversion unit 112 and the third power conversion unit 113 may convert power on the basis of an output voltage of the first power conversion unit 111 and a voltage range of the battery (HV battery) 120.

The second power conversion unit 112 may include a transformer 116 for insulating the battery 120 from the grid 200, and a first capacitor 114 for varying a voltage in charging may be provided between the first power conversion unit 111 and the second power conversion unit 112.

A second capacitor 115 for varying a voltage in discharging may be provided between the second power conversion unit 112 and the third power conversion unit 113. The battery 120 may be connected to the third power conversion unit 113.

The first power conversion unit 111 may vary an output voltage of the first capacitor 114 on the basis of a voltage value of the battery 120, and the second power conversion unit 112 may vary an output voltage of the second capacitor 115 on the basis of a voltage value of the battery 120.

The first power conversion unit 111 and the second power conversion unit 112, for example, may respectively vary an output voltage of the first capacitor 114 and an output voltage of the second capacitor 115 at a variable power conversion rate of 0.9 to 1.15.

Here, the first power conversion unit 111 may be implemented with a grid-connected inverter, the second power conversion unit 112 may be implemented with an LLC converter, and the third power conversion unit 113 may be implemented with a buckboost converter.

Hereinafter, an operation mode of a method of controlling a BOBC according to an embodiment of the present invention will be described.

Figure 4:
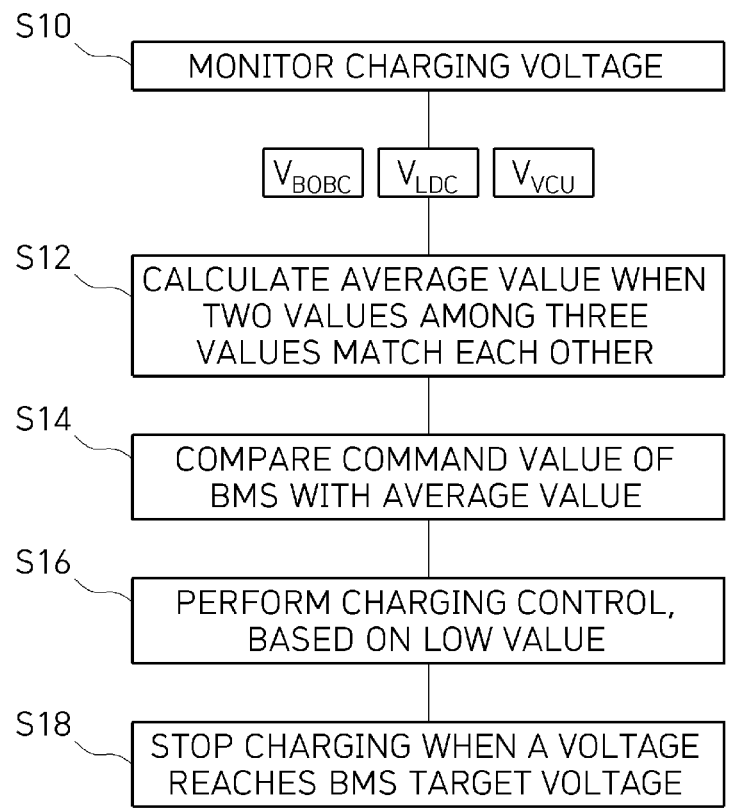
FIG. 4 is a flowchart of a control process performed in a charging mode of a BOBC according to an embodiment of the present invention.

FIG. 4 is a control flowchart in a charging mode of a BOBC and illustrates a control process where the BOBC power converter 110 performs power conversion on an AC voltage of the grid 200 of FIGS. 2 and 3 on the basis of a voltage value of the vehicle DC high voltage battery 120 in performing the charging mode.

A main element for performing each step may be a BMS equipped in a vehicle, an electronic control unit (ECU) in the BMS, or an ECU connected to the BMS through an in-vehicle communication network. Here, the in-vehicle communication network may be a controller area network (CAN) or a local interconnect network (LIN).

S10 may be a step of monitoring a battery voltage value, voltages $V_{BOBC}$, $V_{LDC}$, and $V_{VCU}$ of the BOBC 110, the LDC 160, and the VCU 170 supplied with a voltage from the battery may be obtained through monitoring.

Hereinafter, for convenience of understanding, an example will be described where the voltage $V_{BOBC}$ (i.e., a voltage value sensed by the charger) is 300 VDC, the voltage $V_{LDC}$ (i.e., a voltage value sensed by an LDC which is another controller) is 300.5 VDC, and the voltage $V_{VCU}$ (i.e., a voltage value sensed by the VCU which is another controller) is 303 VDC.

In step S12, two values may be selected by voting three monitored data values, and an average of the two values may be calculated. For example, the voltage $V_{BOBC}$ and the voltage $V_{LDC}$ may be selected as a voting result, and an average thereof (i.e., a charging voltage (battery voltage value) "(300+300.5)/2=300.2 VDC")) may be determined.

As an example which selects two values, a method of selecting two values relatively close to each other or two values having a difference (for example, 1 VDC) within a predetermined range from among three values may be used.

As another example, when at least two values of three values has a difference (2 VDC) within a predetermined range, a charging voltage may be determined by averaging three monitored values.

Figure 5:
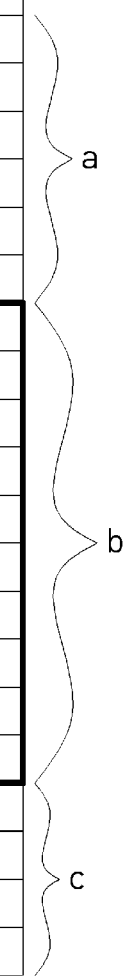
FIG. 5 is an exemplary diagram of a reference voltage value table for determining a charging/discharging power control voltage value.

A voltage for optimum point control in the BOBC 110 may be checked with reference to a pre-written lookup table (chart) show in FIG. 5 on the basis of an average value (a charging voltage). That is, a voltage of the first capacitor 114 of the first power conversion unit 111 and a voltage of the second capacitor 115 of the second power conversion unit 112 may be checked based on the calculated average value (i.e., a battery voltage value) in the lookup table show in FIG. 5.

For example, when a battery voltage is 300 V, a voltage of the first capacitor 114 may have a voltage value of 410 VDC, and a voltage of the second capacitor 115 may have a voltage value of 430 VDC.

In step S14, a command value commanded by the BMS 130 may be compared with the calculated average value.

In step S16, the BOBC power converter 110 may perform charging power control on the basis of a low value among the command value and the charging voltage value. As described above, a charging voltage for the charging power control may be determined based on the table of FIG. 5, and a voltage of the first power conversion unit 111 and a voltage of the second power conversion unit 112 may be variably controlled (in an embodiment, a variable conversion rate may be about 0.95 to 1.15).

In detail, the first power conversion unit 111 may determine the voltage of the first capacitor 114 and may perform power conversion on the basis of a voltage of the battery 120 with respect to the variable conversion rate.

The second power conversion unit 112 may determine the voltage of the second capacitor 115 and may perform power conversion on the basis of the voltage of the battery 120 with respect to the variable conversion rate.

The third power conversion unit 113 may perform conversion at a variable conversion rate based on a voltage of the battery 120 and the voltage of the second capacitor 115.

For example, when a value commanded by the BMS is 310 V, since the average value is 300.2 V, a power of the BOBC power converter 110 may be controlled based on a voltage value of 300.2 V corresponding to a low value. Therefore, with reference to the table of FIG. 5, the voltage of the first capacitor may be controlled to 410 VDC, and the voltage of the second capacitor may be controlled to 430 VDC.

Therefore, according to an embodiment of the present invention, a voltage variation rate may be adjusted to enable fast charging in a period (a of FIG. 5) where the voltage of the battery 120 is low, and a voltage variation rate may be fixed in a main use region (b of FIG. 5), whereby efficiency may be enhanced.

Moreover, in a period (c of FIG. 5) where a voltage is high, a voltage variation rate may be adjusted to maintain the voltage of the battery 120, and thus, a charging time may be shortened.

In step S18, when the command value reaches a target voltage command value of the BMS 130, the charging mode may end. For example, when the command value reaches 430 V which is a target voltage (command value) of the BMS 130, charging may stop.

Hereinafter, a control flow in the discharging mode of the BOBC will be in detail with reference to FIG. 6. FIG. 6 illustrates an operation in the discharging mode of the BOBC 110, namely, a control process in a mode of performing AC power conversion on the voltage of the battery (vehicle DC high voltage battery) 120 according to the grid voltage 200, the home 210, or the load 220.

In step S20, voltage data of the BOBC 110, the LDC 160, and the VCU 170 may be obtained for each controller for monitoring a battery voltage value. Here, for convenience of understanding, it may be assumed that $V_{BOBC}$ is 300 VDC, $V_{LDC}$ is 300.5 VDC, and $V_{VCU}$ is 303 VDC.

In step S22, when two values are selected by voting three pieces of data obtained by using a method described above in step S12, an average value of two voltage values may be calculated. For example, a discharging voltage value "(300+300.5)/2=300.2 VDC" may be determined.

In step S24, a voltage value for optimum point control in the BOBC 110 may be checked based on the calculated average value (check an output voltage of each of the first and second power conversion units 111 and 112). In this case, similarly to the charging mode, the table of FIG. 5 may be used. In detail, a voltage value calculated as a BMS voltage value and the calculated average value may be checked.

The present step may be a step for checking a voltage value before calculation of a state of charge (SOC) value, for comparing SOC values subsequent thereto.

For example, like the charging mode, a voltage value of the BMS may be 303 VDC, and the calculated average value (discharging voltage) may be 300.2 VDC.

In step S26, an SOC value of the BMS 130 may be compared with the average value calculated in the BOBC 110. That is, an SOC value received as data from the BMS may be compared with an SOC value calculated from the checked BMS voltage value and average value.

In step S28, a discharging voltage may be determined based on a low SOC value which is checked through comparison.

In step S30, a voltage of the grid may be checked, and then, discharging control may be performed by using the discharging voltage. In this case, a discharging power control voltage may be used to perform variable control on the voltage of the first power conversion unit 111 and the voltage of the second power conversion unit 112 with reference to a lookup table such as the table of FIG. 5. In the table of FIG. 5, a variable conversion rate may be 0.95 to 1.15.

For example, when an SOC value received from the BMS through CAN communication is 33%, an SOC value calculated from a voltage value 303 V of the BMS may be 33.2%, and an SOC value calculated from the calculated average value 300.2 V may be 31.7%. Therefore, since a low value among the values is 31.7%, a discharging voltage may be determined based on the SOC value "31.7%", and discharging control may be performed. In the discharging control, with reference to the table of FIG. 5, when a voltage value of the battery is 300 VDC, the voltage of the first capacitor may be controlled to 410 VDC, and the voltage of the second capacitor may be controlled to 430 VDC.

When a grid voltage is in a state (for example, when reaching a target power 4 kW of the grid) where the grid voltage has reached a power value set as a target in step S32 or when the load 220 is cut off in step S34, a discharging operation may be performed.

In the related art, since power is converted at a certain conversion rate, the total charging/discharging efficiency of a BOBC is reduced. On the other hand, according to the present invention, since a control method for optimal efficiency is applied, charging/discharging efficiency may be enhanced, thereby enhancing the performance of products, decreasing the cost for consumers, and improving the total cost of vehicle.

In real data, when charging efficiency is improved by 1%, the cost for consumers and the total cost of vehicle are identically enhanced by about 1%, and when discharging efficiency is improved by 1%, the cost for consumers is enhanced by about 1%.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a bidirectional on-board charger (BOBC) which is included in an electric vehicle and performs a charging mode and a discharging mode, the method comprising:
    monitoring and obtaining a voltage supplied from a battery and voltages of two or more objects of the electric vehicle;
    when two values match each other by voting the monitored voltage values, calculating an average value of the two voltage values and checking a voltage for optimum point control in the BOBC on the basis of the average value;
    comparing the calculated average value with a command value of a battery management system (BMS) of the electric vehicle; and
    adjusting a voltage variation rate of the BOBC on the basis of a low value among the command value and a charging voltage value.

2. The method of claim 1, wherein the two or more objects of the electric vehicle obtained in the monitoring and obtaining comprise a low DC-DC converter (LDC) and a vehicle control unit (VCU).

3. The method of claim 1, wherein the checking of the voltage for the optimum point control refers to a lookup table including a voltage value for the optimum point control of the BOBC on the basis of the average value.

4. The method of claim 1, wherein the adjusting of the voltage variation rate of the BOBC comprises:
    adjusting the voltage variation rate to enable fast charging in a period where a voltage of the battery is low;
    fixing the voltage variation rate in a main use region of the battery; and
    adjusting the voltage variation rate to maintain the voltage of the battery in a period where the voltage of the battery is high.

5. A method of controlling a bidirectional on-board charger (BOBC) which is included in an electric vehicle and performs a charging mode and a discharging mode, the method comprising:
    monitoring and obtaining a voltage supplied from a battery and voltages of two or more objects of the electric vehicle;
    when two values match each other by voting the monitored voltage values, calculating an average value of the two voltage values;
    comparing a state of charge (SOC) value of a battery management system (BMS) of the electric vehicle with an SOC value calculated from the average value;
    determining a discharging voltage on the basis of a low SOC value determined through the comparison; and
    checking a voltage of a grid and performing discharging control on the basis of the discharging voltage.

6. The method of claim 5, wherein the two or more objects of the electric vehicle obtained in the monitoring and obtaining comprise a low DC-DC converter (LDC) and a vehicle control unit (VCU).

7. An apparatus for controlling a bidirectional on-board charger (BOBC) which is included in an electric vehicle and performs a charging mode and a discharging mode, the apparatus comprising:
    a first unit configured to monitor and obtain a voltage supplied from a battery and voltages of two or more objects of the electric vehicle;
    a second unit configured to, when two values match each other by voting the monitored voltage values, calculate an average value of the two voltage values and check a voltage for optimum point control in the BOBC on the basis of the average value; and
    a charging control unit configured to compare the calculated average value with a command value of a battery management system (BMS) of the electric vehicle and adjust a voltage variation rate of the BOBC on the basis of a low value among the command value and a charging voltage value.

8. The apparatus of claim 7, wherein, in adjusting the voltage variation rate of the BOBC, the charging control unit adjusts the voltage variation rate to enable fast charging in a period where a voltage of the battery is low, fixes the voltage variation rate in a main use region of the battery, and adjusts the voltage variation rate to maintain the voltage of the battery in a period where the voltage of the battery is high.

9. The apparatus of claim 7, wherein the two or more objects of the electric vehicle obtained in the monitoring and obtaining comprise a low DC-DC converter (LDC) and a vehicle control unit (VCU).

10. The apparatus of claim 7, wherein the second unit refers to a lookup table including a voltage value for the optimum point control of the BOBC on the basis of the average value.

11. The apparatus of claim 7, further comprising a third unit configured to compare a state of charge (SOC) value of a battery management system (BMS) of the electric vehicle with an SOC value calculated from the average value to determine a discharging voltage on the basis of a low SOC value determined through the comparison, and perform discharging control on the basis of the discharging voltage.

\* \* \* \* \*